Dec. 24, 1968 N. T. SPARKS 3,418,453
ELECTRICALLY HEATED DOUGH RAISING OVEN
Filed June 13, 1966 2 Sheets-Sheet 2

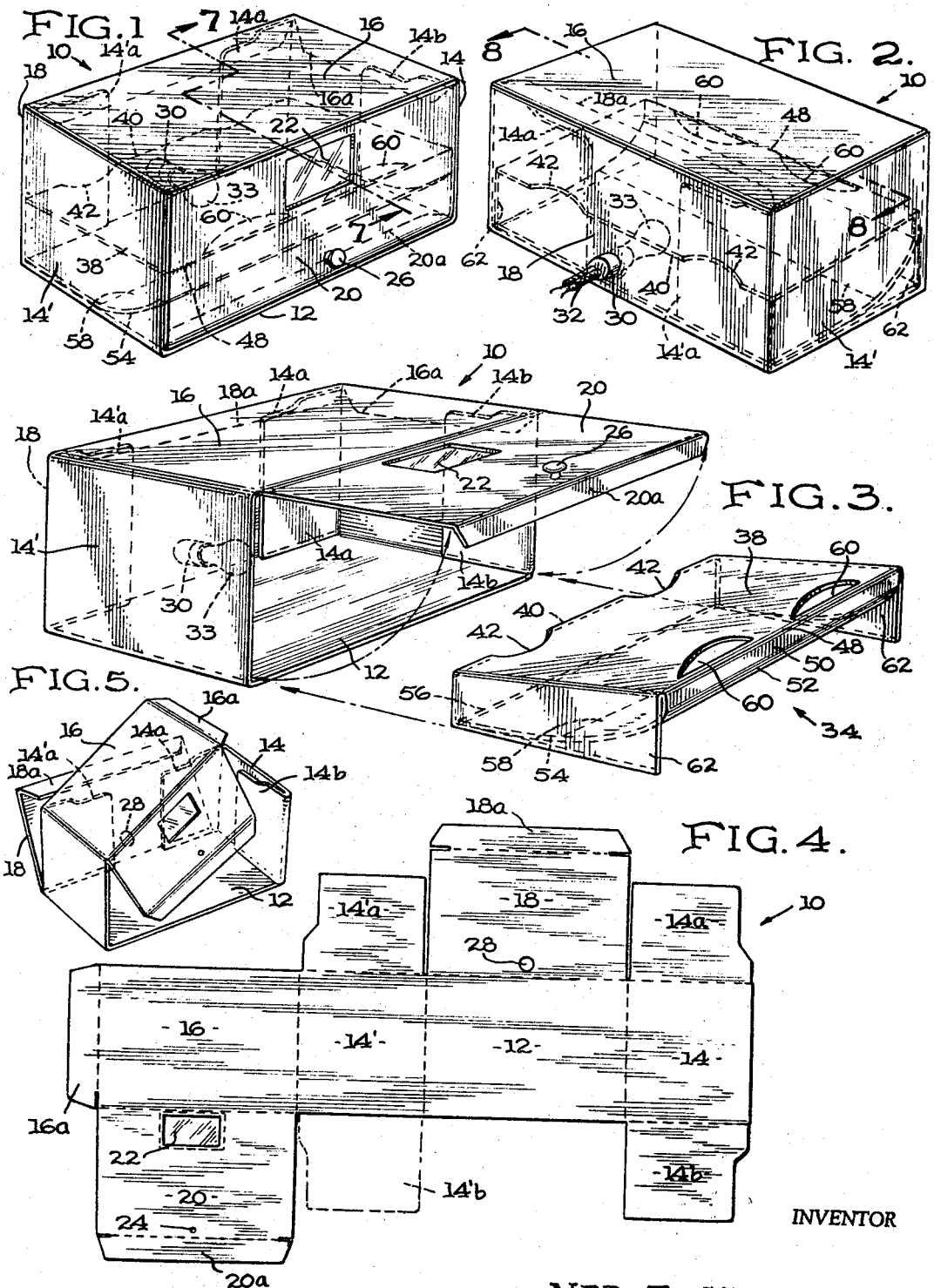

INVENTOR
NED T. SPARKS
BY Edwin E. Gregg
ATTORNEY

United States Patent Office 3,418,453
Patented Dec. 24, 1968

3,418,453
ELECTRICALLY HEATED DOUGH RAISING OVEN
Ned T. Sparks, 1613 N. Springwood Drive,
Silver Spring, Md. 20910
Filed June 13, 1966, Ser. No. 556,986
9 Claims. (Cl. 219—400)

ABSTRACT OF THE DISCLOSURE

A portable dough raising oven having a housing erectable from a one-piece blank of scored insulative material, and an electric light bulb and receptacle means carried by one wall of said housing. A combined dough supporting tray and heat directing baffle removably mounted within the housing.

This invention relates to dough raising apparatus, and more particularly to an improved dough raising oven or box especially suitable for home use but also readily adaptable for use in bakeries. Baking dough containing yeast among the ingredients is usually placed in baking pans which is often allowed to set in room temperature to raise, but due to variable temperature and humidity conditions the dough is sometimes adversely affected and does not raise properly.

Accordingly, it is one object of the present invention to provide an improved dough raising oven in which dough is placed in pans and allowed to raise in air which is maintained at a predetermined, substantially constant temperature.

Another object of the invention is to provide an improved dough raising oven which is readily constructed of inexpensive serviceable material which is inherently an insulating material, such as corrugated cardboard or the like, which is light in weight and therefore readily portable in nature.

A further object is to provide an improved dough raising oven according to the preceding objects which embodies removable baffle plate and shelf means for dividing the oven into two basic chambers respectively aiding in the circulation of air past a heating element provided within one chamber, from front to back thereof passing through the dough raising chamber, and for supporting the pans or trays of dough to be acted upon therewithin.

Still another object of the invention is to provide a dough raising oven of the class described which is simple in construction, efficient in operation, and has its elements so arranged that the interior of the oven together with the removable shelf, provide both a readily accessible, unobstructed dough-raising chamber and heating chamber which are readily cleanable after use thereof.

These and other objects and advantages will become more apparent from the following detailed specification taken in conjunction with the accompanying illustrative drawings, wherein:

FIG. 1 is a three-quarter perspective view looking from above and at the front and one end thereof;

FIG. 2 is a perspective view similar to FIG. 1 but looking at the back and one end thereof;

FIG. 3 is a frontal perspective view as seen from a slightly different angle than FIG. 1 and showing the door open with the combined baffle plate and shelf in its removed condition;

FIG. 4 is a reduced scale plan view of a preferred form of developed blank from which the oven receptacle per se is constructed;

FIG. 5 is a reduced perspective view depicting the blank of FIG. 4 being folded into the completed oven receptacle;

Figure 6:
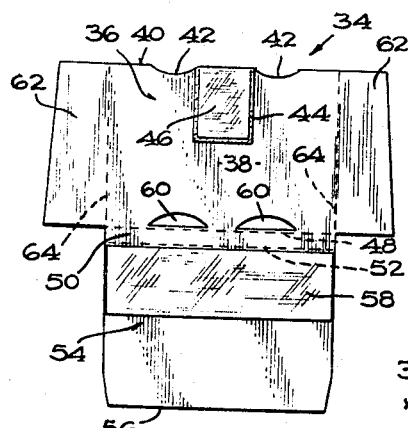
FIG. 6 is a reduced scale plan view of the developed blank which forms the combined baffle plate and shelf.

Referring more particularly to the preferred oven construction of FIGS. 1–8, the improved receptacle is generally denoted at 10 and is preferably fabricated of a material having inherent insulating qualities, such as corrugated cardboard embodying a plurality of dead air spaces therein. The receptacle 10 basically includes a bottom wall 12, spaced side walls 14 and 14', a top wall 16, a back wall 18, and a front wall or door 20 having a window 22 to enable a person to view the dough raising in the box without opening the door.

While the box or receptacle 10 may be fabricated of individual sections, it is preferred that it be formed integrally or stamped in the developed blank form, as shown in FIG. 4, wherein the side wall 14 is provided with free flap extensions 14a and 14b, and the side wall 14' is provided with at least one free flap extension 14'a, and optionally with flap 14'b shown in broken outline. The aforesaid flap extensions provide added rigidity to the receptacle and may be provided with a suitable adhesive coating on the appropriate face to facilitate assembly formation of the box. Top wall 16 and back wall 18 are provided with flap extensions 16a and 18a respectively, which are of lesser extent and are also preferably pre-glued to facilitate expeditious assembly of the receptacle, as shown in FIG. 5.

The door panel 20 is provided with a flap extension 20a which, when tucked in, adjacent the front edge of bottom wall 12, serves to better seal the oven receptacle and increases the heat retention.

Each of the afore-mentioned panels and flaps are foldable about and connected to their respective adjacent panel sections by suitable fold lines shown as dashed lines in FIG. 4.

The front wall 20 is provided with a small aperture 24 to facilitate mounting of a suitable door handle 26 thereon. The back wall panel 18 is provided near the lower medial area with a somewhat larger aperture 28 adapted to receive the removable, preferably two-piece light bulb socket 30 which is connected preferably with the conventional household electrical source of 115 v. A.C. as by electric wire means 32, FIGS. 2 and 7. A small wattage conventional light bulb 33, on the order of 15 watts, has been found to operate an oven with overall dimensions of approximately 9″ x 10″ x 14″ very satisfactorily to generate the desired temperature range of approximately 90°–95° F. at normal household temperatures when enclosed by the baffle-shelf insert member designated generally as 34, now to be described.

Insert 34 is a combined baffle and shelf and comprises a body 36 of light weight but relatively rigid sheet material, such as cardboard, and is preferably fabricated or stamped in one piece as depicted by the developed blank shown in FIG. 6. The one piece body 36 includes a primary panel which serves as the tray supporting shelf 38 and also as the upper wall of the baffle. The shelf panel 38 terminates in one free edge 40 provided with spaced air circulating openings or notches 42, 42 and which edge 40 is adapted to abut the horizontal medial area of the back wall 18 of the oven receptacle when in assembled condition. Intermediate the notches 42, 42 an insulating layer 44 and a heat reflective panel 46, such as aluminum or other light-weight metal foil, in laminated forms are affixed to the medial area of the shelf 38 which lamination is adapted to be positioned over the heating and lighting source 33. Opposite the rearward edge 40 there is a forward edge defined by a dotted fold line 48 which also serves to integrally join shelf 38 with a short length of panel 50 which constitutes a front, generally vertically disposed wall. The said front wall 50 is integrally joined by another fold line 52 to the lowermost baffle wall 54 which slopes downward and rearward as shown better in FIG. 7, terminating in a lower free edge 56 parallel to edge 40 and disposed beneath light 33 against the juncture of the oven receptacle's rear wall 18 and bottom wall 12.

At the forward portion of the inclined baffle wall 54 there is affixed a heat reflecting panel 58, such as aluminum foil or the like, which extends laterally the full width of the panel. This reflective panel 58 serves the dual purpose of both insulating the panel 54 and to aid the convection of the heated air currents which rise upward along the inclined wall panels 54 and pass through a pair of convection openings 60, 60 corresponding generally to openings 42, 42 but provided in the shelf panel 38 adjacent the forward edge 48 as clearly shown in the drawing figures. The combined shelf-baffle panel 38 is supported in a slightly rearwardly inclined spaced relation above the bottom wall 12 of the oven, by means of a spaced-apart pair of end supporting panels 62, 62 formed integrally with the lateral edges of panel 38 and each foldable about fold lines 64, shown dotted in FIG. 6, which also serve to define the lateral edges of panel 38.

Figure 7:
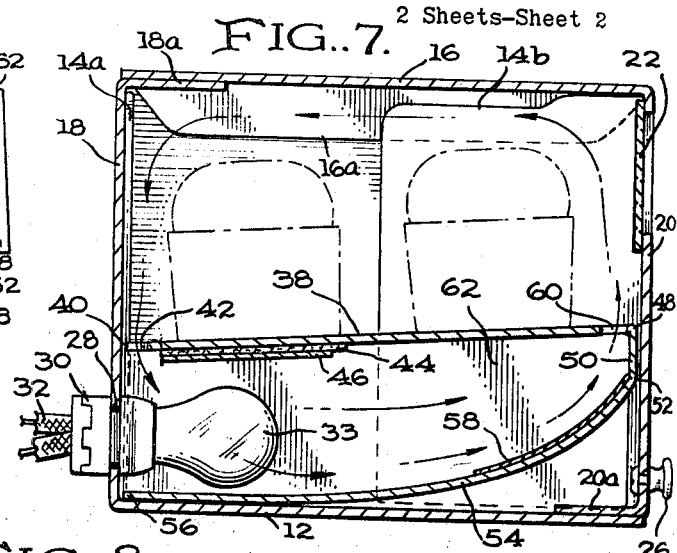
FIG. 7 is an enlarged transverse cross-sectional view of the closed oven as taken substantially on line 7—7 of FIG. 1.
Figure 8:
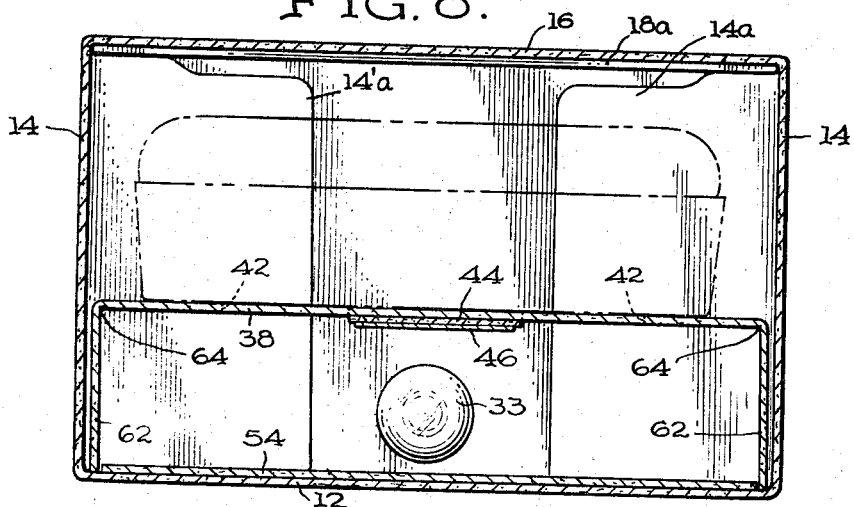
FIG. 8 is an enlarged longitudinal cross-sectional view on the same scale as FIG. 6, as viewed substantially on line 8—8 of FIG. 2.

When the oven receptacle 10 is in its generally assembled condition and the baffle shelf inesrt 34 is also in its respective folded condition, the latter is simply inserted into the former through the open door panel 20 in the manner shown in FIG. 3 to complete the combined assembly. The cross-sectional view of FIG. 7 depicts more clearly the completely assembled relationship of all of the components and includes the phantom outline of a pair of bread or other confectionary trays of dough as they are intended to be supported on shelf 38 therewithin. FIG. 8 is a further clarifying, longitudinal cross-sectional view of the completed assembly of FIG. 7.

Figure 9:
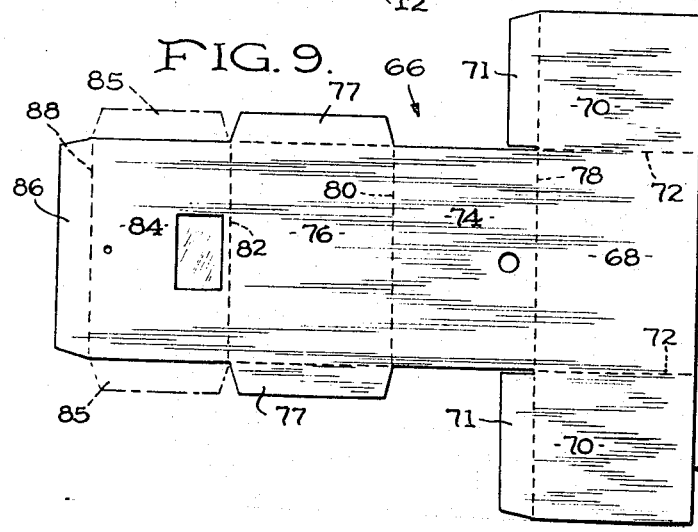
FIG. 9 is a plan view similar to FIG. 4 but of an alternative form of developed blank from which the oven receptacle per se may be fabricated.
Figure 10:
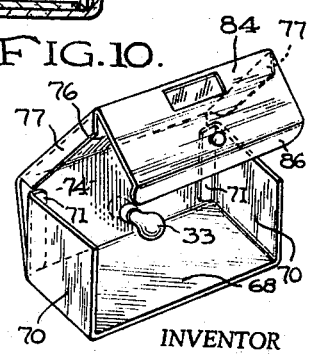
FIG. 10 is a reduced perspective view depicting the blank of FIG. 8 being folded into the completed oven receptacle.

FIG. 9 is a plan view of an alternative form of one piece developed blank designated generally as 66 from which the oven receptacle can be readily formed. Blank 66 includes a bottom wall 68 having laterally joined end wall panels 70, 70 separated therefrom by the fold lines 72, 72 shown in dashed lines. A back wall panel 74 intermediately adjoins both the bottom panel 68 and a top panel 76 by being separately defined therefrom by fold lines 78 and 80 respectively. Integrally attached to the top panel 76 along a fold line 82, opposite fold 80, is the front windowed door panel 84 having at least one closure flap 86 continued therefrom and foldable about dotted line 88. Each end panel 70, 70 is provided with assembly flaps 71, 71 respectively which may be pre-glued for joining with adjacent opposite edges of back wall 74. The top wall panel 76 is provided with opposed free flaps 77, 77 which also may be pre-glued to facilitate joining with the respective edges opposite the flaps 71, 71 of end panels 70, 70. The front door panel may be provided with optional side flaps designated 85, 85 and shown in phantom outline to additionally aid in making the oven receptacle more air-tight. FIG. 10 further depicts the folding assembly of this alternate blank.

The same combined baffle-shelf insert 34 is used with both embodiments. It is to be understood that while the side supporting walls 62, 62 of the insert 34 are shown as full, generally trapezoidal shaped panels, that they may be partially cut out or perforated in a manner, not shown, which will still support the desired trays or pans while further reducing the already light weight thereof.

A further particular advantage is the simplicity and inexpensiveness of the various components which readily lend themselves to easy assembly and disassembly from knock-down kit form. These kits preferably would comprise the pre-stamped, pre-glued developed blanks of the oven housing, baffle shelf insert, a small knob or door handle and two-piece light socket including complementally threaded halves for assembly through the aperture provided in the back wall of the oven, together with a set of assembly and operating instructions. These kits, because of their simplicity and ultra-low cost, will lend themselves to mass production and distribution, and particularly would serve as very desirable premium or give-away gift items such as offered by cereal or bakery manufacturers on their product cartons.

The operation which is deemed to be self-evident in view of the foregoing detailed description, will now be reviewed. Referring more particularly to FIG. 7, when the heating means 33, which also serves to illuminate the oven, is energized, the air surrounding it is immediately warmed and reflected from foil layers 46 and 58 whereby it passes by convection currents along the heating chamber defined by the baffle and lower wall portions of the oven, following the inclined walls 38 and 54, passing upward through forward openings 60, circulating up and around the trays of dough, whereupon the air, having cooled slightly, passes downwardly through the rearward openings 42 to be reheated by the light bulb 33 and recirculated slowly over and over until the dough has fully raised.

Accordingly, it is apparent from the foregoing detailed description that an improved dough raising oven assembly has been evolved which achieves all of the objects and advantages as set forth in the preamble of the specification. It is to be further understood that substantially and proportionately larger units may be fabricated using a proportionately larger wattage light bulb as the heating means in accordance with the specific needs.

While specific detailed description and illustrations have been made, it is to be understood that various changes and alterations may be evolved by those familiar with the art, without departing from the spirit and inventive scope as defined in the appended claims.

I claim:
1. In a dough raising device, the combination of
   (a) an insulated portable rectangular housing erectable from scored material having bottom, side and top wall panels including one door panel when in assembled condition;
   (b) an electric light bulb and receptable means carried by one wall of the housing and adaptable for connection with an external source of electricity; and
   (c) a combination heat directing baffle and dough tray supporting shelf enclosing the electric light bulb and removably mounted within the erectable housing in a manner to horizontally divide the housing into a heat generating lower chamber and a dough raising upper chamber.
2. In a dough raising device, the combination as defined in claim 1, wherein the housing is fabricated from a one piece foldable blank of sheet material possessing inherent insulation qualities.
3. In a dough raising device, the combination as defined in claim 1, wherein the combination baffle and shelf is fabricated from a one-piece blank of sheet material including
   (a) an upper generally horizontally disposed panel having pairs of opposed side edges;
   (b) a relatively short front panel depending from one edge of the upper panel;
   (c) a lower panel attached at one edge to the lower portion of the front panel and inclined downwardly and away therefrom; and
   (d) a pair of opposed side panels depending from a pair of opposed edges of the upper panel having lower free edges adapted to engage the bottom panel of the housing to support the upper panel in spaced relation thereabove.

4. In a dough raising device, the combination as defined in claim 3, wherein
   (a) the upper panel is provided with a pair of spaced convection openings along each of a pair of opposed side edges; and
   (b) said upper panel is provided with a heat reflective means on its underside, disposed between one pair of convection openings and above said light bulb when in assembled condition.

5. In a dough raising device, the combination as defined in claim 3, wherein
   (a) the upper panel is provided with a pair of spaced convection openings along each of a pair of opposed side edges;
   (b) said upper panel is provided with a heat reflective means on its underside, disposed between one pair of convection openings and above said light bulb when in assembled condition; and
   (c) a heat reflective means provided on the inclined forward portion of the lower panel in opposed relation to the other pair of convection openings when in assembled condition.

6. For use in combination with a dough raising oven housing including a heat source and having bottom, side and top wall panels, a combination heat-directing baffle and tray-supporting shelf erectable from a one-piece blank of sheet material comprising
   (a) an upper generally horizontally disposed panel having pairs of opposed side edges;
   (b) a relatively short front panel depending from one edge of the upper panel;
   (c) a lower panel attached at one edge to the lower portion of the front panel and inclined downwardly and away therefrom; and
   (d) a pair of opposed side panels depending from a pair of opposed edges of the upper panel having lower free edges adapted to engage the bottom panel of the housing to support the upper panel in spaced relation thereabove.

7. An article of manufacture as defined in claim 6, wherein
   (a) the upper panel is provided with a pair of spaced convection openings along each of a pair of opposed side edges; and
   (b) said upper panel is provided with a heat reflective means on its underside, disposed between one pair of convection openings.

8. An article of manufacture as defined in claim 6, wherein
   (a) the upper panel is provided with a pair of spaced convection openings along each of a pair of opposed side edges;
   (b) said upper panel is provided with a heat reflective means on its underside, disposed between one pair of convection openings; and
   (c) a heat reflective means provided on the inclined forward portion of the lower panel in opposed relation to the other pair of convection openings when in assembled condition.

9. In a dough raising device, the combination of an insulated portable rectangular housing erectable from a scored blank and having bottom, side and top wall panels including one door panel when in assembled condition, an electric light bulb and receptacle means carried by one wall of the housing and adaptable for connection with an external source of electricity, a heat directing baffle means removably mounted within the housing, a dough tray supporting shelf removably positioned in said housing above said baffle means, said heat directing baffle means and said shelf enclosing the electric light bulb and horizontally dividing the housing into a heat generating chamber and a dough raising chamber.

References Cited

UNITED STATES PATENTS

| Re. 24,296 | 3/1956  | Stewart     | 219—405 X |
| 1,282,195  | 10/1918 | Crary       | 219—405 X |
| 2,134,474  | 10/1938 | Gillespie   | 219—405 X |
| 2,499,525  | 3/1950  | Person      | 126—281 X |
| 2,571,218  | 10/1951 | Del Buttero | 219—405 X |
| 2,864,932  | 12/1958 | Forrer      | 219—405 X |
| 3,152,243  | 10/1964 | Andrews     | 219—405   |
| 3,327,092  | 6/1967  | Wilson      | 219—214   |

VOLDOYMYR Y. MAYEWSKY, Primary Examiner.

U.S. Cl. X.R.

219—405; 126—281